US011568469B1

(12) United States Patent
Zhang et al.

(10) Patent No.: US 11,568,469 B1
(45) Date of Patent: Jan. 31, 2023

(54) SYSTEMS AND METHODS FOR GENERATING RECOMMENDATIONS BASED ON MULTI-CHANNEL INPUTS

(71) Applicant: Amazon Technologies, Inc., Seattle, WA (US)

(72) Inventors: Rongting Zhang, Seattle, WA (US); Jie Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/933,647

(22) Filed: Jul. 20, 2020

(51) Int. Cl.
*G06Q 30/00* (2012.01)
*G06Q 30/06* (2012.01)
*G10L 15/26* (2006.01)

(52) U.S. Cl.
CPC ..... *G06Q 30/0631* (2013.01); *G06Q 30/0603* (2013.01); *G06Q 30/0641* (2013.01); *G10L 15/26* (2013.01)

(58) Field of Classification Search
CPC ...... G06Q 30/0601–0645; G06Q 30/08; G10L 15/26
USPC ................................................ 705/26.1–27.2
See application file for complete search history.

(56) References Cited

U.S. PATENT DOCUMENTS

| 8,095,523 | B2 | 1/2012 | Brave et al. | |
| 8,290,828 | B2 | 10/2012 | Stoppelman | |
| 2003/0208399 | A1 | 11/2003 | Basak et al. | |
| 2012/0054019 | A1* | 3/2012 | Kitts | G06Q 30/0246 705/14.41 |
| 2014/0032359 | A1 | 1/2014 | Dewangan | |
| 2014/0337131 | A1 | 11/2014 | Edara | |
| 2018/0084111 | A1* | 3/2018 | Pirat | H04L 51/04 |
| 2019/0026754 | A1* | 1/2019 | Miltonberger | G06Q 30/0225 |
| 2020/0294108 | A1* | 9/2020 | Perry | G06Q 30/0641 |
| 2020/0387302 | A1* | 12/2020 | Uttam | G06Q 30/0641 |
| 2020/0401932 | A1* | 12/2020 | Kumar | G06Q 30/0201 |

OTHER PUBLICATIONS

Marvin, Ginny, Google Attribution: What search marketers need to know, May 30, 2017, searchengineland.com, accessed at [https://searchengineland.com/google-attribution-search-marketers-need-know-275751] (Year: 2017).*

\* cited by examiner

Primary Examiner — Jeffrey A. Smith
Assistant Examiner — Lindsey B Smith
(74) Attorney, Agent, or Firm — Knobbe, Martens, Olson & Bear, LLP

(57) ABSTRACT

Features are disclosed for training and using a recommendation model configured to receive inputs from a user via a first channel and a second channel. The recommendation model can be trained with inputs from the first channel and inputs from the second channel. The recommendation model can receive a plurality of inputs from multiple channels and determine a probability of a future potential event for each channel. The probabilities may be based on the probability of a repeat event and the probability of a general event. The recommendation model may generate a recommendation for the user based on the probabilities of a future potential event.

20 Claims, 7 Drawing Sheets

SYSTEMS AND METHODS FOR GENERATING RECOMMENDATIONS BASED ON MULTI-CHANNEL INPUTS

BACKGROUND

Recommendation systems include various modules and components for receiving an input from a user and generating a recommendation for the user based on what the recommendation systems deem a probabilistic future input of the user. In some implementations, a recommendation system may include various modules for receiving the input and determining the intent of the user. The recommendation system may identify particular aspects of the input that are of particular importance in generating the recommendation. The recommendation system can receive a plurality of inputs from the user and determine, based on the inputs, a recommendation representing a likely future input of the user. For example, if the plurality of inputs corresponds to a purchase of eggs and a purchase of bacon, the recommendation system may determine a recommendation of a purchase of bread.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
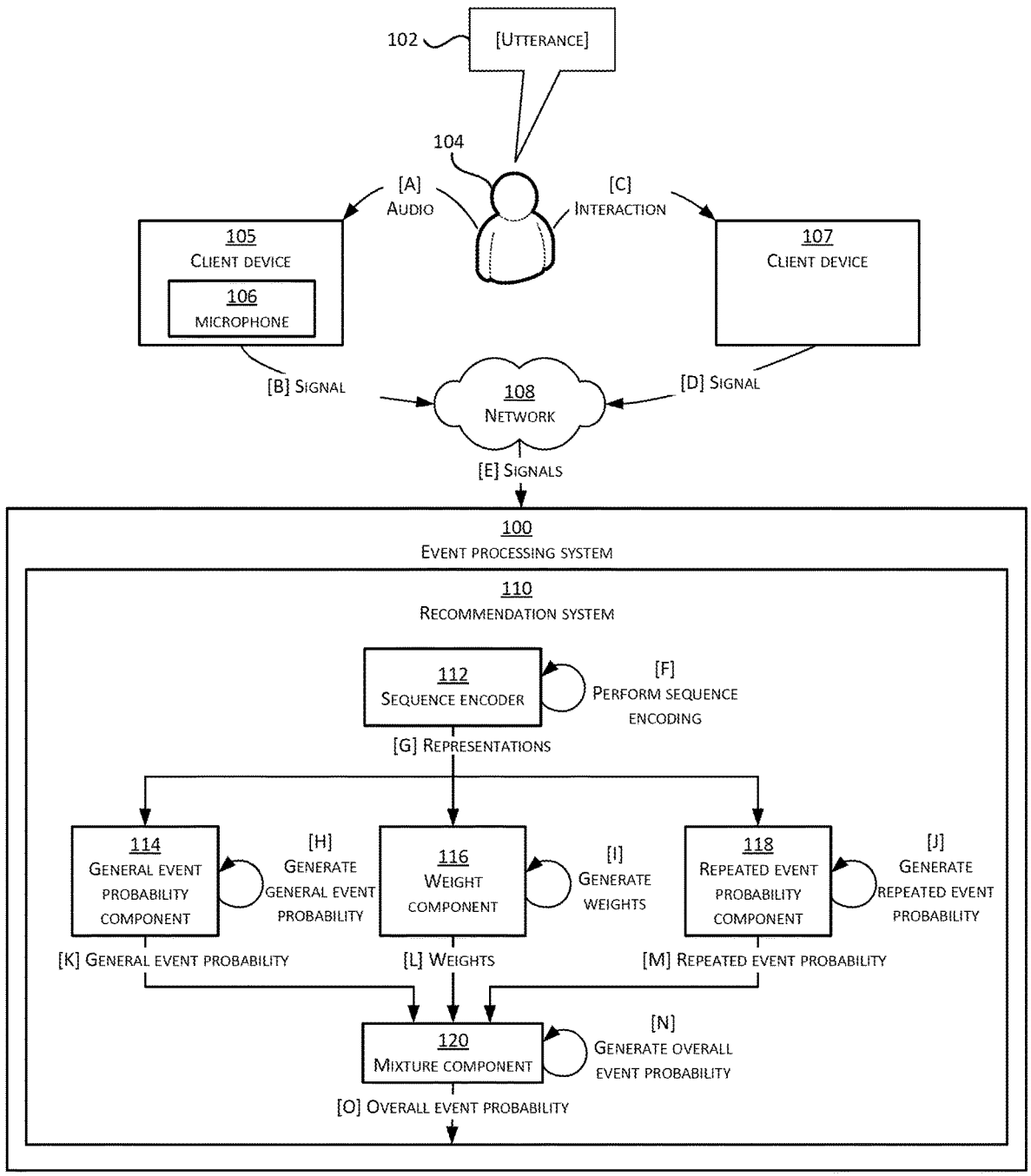
FIG. 1 depicts a schematic diagram of a recommendation system, including a sequence encoder, probability components, a weight component, and a mixture component in accordance with aspects of the present disclosure.

The present disclosure is directed to a recommendation system that can receive a plurality of inputs (e.g., previous item acquisition events) associated with a user and generate output (e.g., a probability that a subsequent item acquisition event will occur). In generating the output, the recommendation system may generate a probability for each potential event of a plurality of potential events, each probability corresponding to the likelihood that the respective potential event will occur. Further, the recommendation system can generate a recommendation representing a probabilistic future event for the user based on the plurality of outputs. The plurality of inputs may correspond to data received via a plurality of channels. For example, the data may be received through multiple channels that operate in different modalities such as an auditory modality (e.g., voice input via a microphone), a visual modality (e.g., textual or graphical user interface input via a computer, a mobile device, in-person systems), or other channels. Based on an input received for the user, the recommendation system can generate a distinct set of probabilities for each channel based on the plurality of inputs from all channels. The recommendation system may be trained to learn dependencies between inputs received across multiple channels. The recommendation system may also consider a general probability (e.g., the probability that a new event will occur) and a repeated probability (e.g., the probability that an event will be repeated, where the repeated event may be the repurchasing of an item) for each potential event of the plurality of potential events. Based on the probabilities, the recommendation system may subsequently determine a recommendation for a probabilistic future event. Further, subsequent to generating the recommendation, the recommendation system can generate a command to be performed by an application. For example, the recommendation system can receive an input "Purchase 10 Acme widgets" from a user corresponding to a request to purchase 10 Acme widgets. Based on the input and other inputs of the user, the recommendation system can generate a recommendation for a potential event (such as purchasing additional Acme products or additional widgets). The recommendation system may further cause a recommendation to be presented to the user. Further, items corresponding to the recommendation may be subsequently be prepared for purchase by the user.

The task of navigating a large electronic catalog of items (e.g., a catalog with thousands or millions of items) to locate items of interest can be burdensome and time consuming for users, especially if the users do not know the names or generic descriptors of the desired items. With interfaces implemented in some modalities (such as graphical user interfaces), the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest. Interfaces implemented in some modalities, such as those with voice-based user interfaces, can compound these issues due to the limited amount of data that may be presented at a given time, the speed at which interactions occur, and other limitations of the interfaces.

Recommendation algorithms and user interfaces of the type disclosed herein significantly reduce this problem, allowing users to locate items of interest with fewer steps, and/or to be proactively presented with information regarding items of interest. For example, in the embodiments described herein, when the user is presented with one or more item recommendations, users can respond with an actionable command (e.g., a voice command to initiate an acquisition event or to obtain further information) without requiring additional navigation operations. Each recommendation thus serves as a programmatically selected navigational shortcut to an actionable command, allowing the user to bypass the navigational structure of the browse tree or its audio modality equivalent of a multi-turn dialog. Beneficially, programmatically identifying items of interest and presenting the user with navigational shortcuts to these items improves the speed and efficiency of the user's navigation through the electronic catalog by reducing or eliminating the need for the user to perform navigation and/or search actions to locate such items. This can be particularly true for non-visual modalities or computing devices with small screens, where fewer items can be presented to the user at a time and thus navigation of larger volumes of items is more difficult.

In many conventional cases, implementing a general recommendation system on input data may not provide satisfactory results in particular circumstances or for particular users. For example, a general recommendation system that is generating recommendations for an audio channel may not consider inputs received via a non-audio channel and may be limited to inputs received via the audio channel. If the number of inputs received via the audio channel is not sufficient to train model used by the recommendation system, then the output of a model trained on such limited data may not be satisfactory. In some cases, a general recommendation system that makes recommendations based on inputs from different channels may only have access to a disparate number of inputs. For example, the number of inputs received via a first channel (e.g., a non-audio channel) may be large and the number of inputs received via a second channel (e.g., an audio channel) may be small. A general recommendation system for the second channel may not produce satisfactory recommendations using the inputs received via the first channel when generating a recommendation for the second channel. Further, the general recommendation system may exhibit poor performance in recognizing the probability that an event is repeated as the recommendation system may not have learned the probability that a user repeats a previous event for a specific channel. Conventional recommendation systems may therefore be inadequate in the aforementioned situations.

Some aspects of this disclosure relate to training and using a model for a recommendation system which is configured to receive inputs regarding events occurring via a first channel and inputs regarding events occurring via a second channel for generating recommendations for a user. The recommendation system model can be trained to generate a recommendation corresponding to probable, future events of the user. A recommendation system that uses input from multiple channels is able to provide increased precision and recall in generating recommendations without significantly impacting computation speeds offered by conventional recommendation system. The recommendation system can be provided input from a first channel (e.g., an audio channel) corresponding to previous events on the first channel and inputs from a second channel (e.g., a non-audio channel) corresponding to previous events on the second channel, each event may designate a particular item associated with a user and a time associated with the event. The recommendation system may be trained to learn a weight associated with a repeated event probability and a weight associated with a general event probability. Further, the recommendation system may be trained to learn a user-bias associated with a given user. The recommendation system may then be trained to generate a recommendation based on the input from the first channel and the input from the second channel. The recommendation system output can correspond to a list of possible recommendations based on input data regarding events occurring via the first channel and input data regarding events occurring via the second channel.

The recommendation system may generate separate recommendations for each channel while considering inputs from all channels when generating each recommendation. Further, the recommendations generated by the recommendation system may be specific to a given channel for which the recommendation is generated. For example, while the recommendation system may use the same inputs for generating a recommendation for an audio channel and a recommendation for a non-audio channel, the recommendation for an audio channel may be different from the recommendation for a non-audio channel. While the recommendation for the audio channel and the recommendation for the non-audio channel may correspond to the same user, the recommendation system may determine that a higher probability is associated with the user purchasing potential item A via the audio channel and potential item B via the non-audio channel.

To determine the recommendation, the recommendation system may analyze a plurality of previous inputs received from the user. The inputs may be received over multiple channels, and may be used to capture similarities and dissimilarities between the inputs received over the multiple channels. For example, previous inputs may be received via an audio channel and a non-audio channel, such as inputs received via a graphical user interface of a user computing device and inputs received via a microphone of a smart speaker or mobile device. Each recommendation may be based on the probability that an event is repeated by the user and/or a probability that a new event occurs. Therefore, output of the recommendation system represents inputs that the recommendation system has learned from multiple channels of input. Further, output of the recommendation system may be based not only on a probability that the user will repeat a previous input, but also on a probability that the user will generate a new input.

In some embodiments, the recommendation system may be a neural transfer network configured to transfer insight gained from analyzing input received via a first channel to a second channel. Input received via the second channel can be analyzed along with the input received via the first channel to provide an accuracy boost to the recommendation system in accurately predicting a future potential event of the user on the second channel. The input received via the first channel and the input received via the second channel can be used to determine a plurality of general event probabilities and a plurality of repeated event probabilities. The plurality of general event probabilities and the plurality of repeated event probabilities may further be adjusted by a weight learned during training. Each weight can be based on the channel for which the recommendation is generated. For example, the weight may be increased when the recommendation system is generating recommendations for the audio channel. Further, the weight may be decreased when the recommendation system is generating recommendations for the non-audio channel. The use of a weighted plurality of general event probabilities and a weighted plurality of repeated event probabilities can provide further indications to the recommendation system that a potential event for the user is more probable. For example, a conventional recommendation system may determine a low probability that the user will make a certain purchase. Therefore, potential events that may be recognized by a conventional recommendation system for a first channel as having low probabilities may be recognized as having higher probabilities by the disclosed recommendation system due to the addition of a weighted plurality of general event probabilities and a weighted plurality of repeated event probabilities.

The recommendation system architecture can be configured as a multi-layer network to receive inputs from a plurality of channels. The recommendation system can receive inputs from multiple channels and associate each input with time data. Further, each input may be associated with a given channel. For example, where inputs are received via an audio interface and a graphical user interface ("GUI"), the received inputs may be formed into the following events: "10 Acme widgets, 2019 Oct. 24, audio," "5 GlobeX widgets, 2019 Aug. 15, GUI," and "24 Acme widgets, 2017 May 10, audio."

In some embodiments, the recommendation system includes a sequence encoder to generate user representations based on the previous events. The user representations may include representations across multiple channels based on previous inputs of the user. The sequence encoder can further include an embedding layer and a pooling layer to generate the user representations. The embedding layer may capture the dependency between the inputs based on the semantic affinity of various requests in the embedding space. For example, the embedding layer may be trained to learn a relationship between a purchase by the user and multiple other purchases. Further, the pooling layer may generate user representations that are used to generate one or more general event probabilities, one or more repeated event probabilities, and/or one or more weights.

The user representations may include a first user representation to generate one or more general event probabilities, a second user representation to generate one or more weights, and a third user representation to generate one or more repeated event probabilities. The first user representation may be used to predict a user's general preference over an entire item space. The second user representation may be used to predict a user's likelihood of repeating any previously-occurring event. The third user representation may be used to predict a user's repeated preference over a limited item space.

The recommendation system may further include a general event probability component to generate the general event probability. The general event probability component may receive the first user representation and the inputs corresponding to items of an item catalog and generate one or more general event probabilities. The one or more general event probabilities may be generated for previously-occurring events for the user and events that have not previously occurred with respect to the user. The one or more general event probabilities may include a probability that a particular event will occur (rather than being limited to the reoccurrence of a previously-occurring event, as represented by one or more repeated event probabilities described below). The one or more general event probabilities may be based on one or more general probabilities of occurrence over all channels and one or more specific probabilities unique to a specific channel. The difference between the general probabilities and the specific probabilities may be based on the first user representation associated with the user. Further, the general event probability component may generate a plurality of probabilities for a first channel and a plurality of probabilities for a second channel.

The recommendation system may further include a weight component. The weight component may receive the second user representation and generate the weights. The weight component may be trained to generate a number of weights, each weight associated with general event probabilities or repeated event probabilities of a specific channel. For example, for a specific channel, the weight component may generate a first weight associated with the general event probabilities and a second weight associated with the repeated event probabilities. In some embodiments, the first weight may be a number between 0 and 1. Further, the second weight may be equal to one minus the first weight. In other embodiments, the first weight and the second weight may have any other relationship. In other embodiments, the first weight and the second weight may not be related.

The recommendation system may further include a repeated event probability component. The repeated event probability component may receive the third user representation and the inputs and generate the one or more repeated event probabilities. The one or more repeated event probabilities are a probability that a previously-occurring event will be repeated. The one or more repeated event probabilities may be based on time data associated with the inputs and time data associated with the recommendation in order to model a time-recency bias associated with the one or more repeated event probabilities. The time-recency bias generally results in higher repeated event probabilities for events occurring more recently than for events occurring less recently.

The recommendation may further include an overall event probability component. The overall event probability component may receive the one or more repeated event probabilities, the one or more general event probabilities, and the one or more weights for the one or more general event probabilities and/or the one or more repeated event probabilities. Further, the overall event probability component may generate an overall probability for each potential event based on the one or more repeated event probabilities, the one or more general event probabilities, and the one or more weights. The one or more overall event probabilities may be specific to the channel for which the recommendation is being generated. Based on the overall probability component, the recommendation system may generate a recommendation representing a probabilistic future event (e.g., a probabilistic future purchase) of the user.

Various aspects of the disclosure will now be described with regard to certain examples and embodiments, which are intended to illustrate but not limit the disclosure. Although aspects of the embodiments described in the disclosure will focus, for the purpose of illustration, on an event processing system that receives information from multiple channels, such as an audio channel and a non-audio channel, and includes a recommendation system to generate a recommendation corresponding to a probabilistic future event, one skilled in the art will appreciate that the techniques disclosed herein may be applied to any number of software processes or applications performing data analysis. For example, the event processing system may be used to receive purchase information from multiple non-audio channels.

FIG. 1 illustrates an event processing system 100 in which a recommendation system 110 may be implemented according to some embodiments. The recommendation system 110 may be implemented to solve a sequential recommendation problem: given a sequence of inputs from a user via a first channel and a second channel, predict the occurrence of a future event. Equation 1 provides one expression of such a recommendation problem.

$$P(v^d_{t_{k+1}} = v | S_u, T_u), \ v \in V, d \in D \qquad \text{EQUATION 1}$$

In Equation 1, P may represent the probability function, v may represent a given item, V may represent the set of all items, u represents a given user, $S_u$ may represent the sequence of events associated with the user (e.g., each acquisition of an item v by user u), t may represent a time, $T_u$ may represent the sequence of time data associated with each event associated with the user (e.g., timestamps of each item acquisition event represented by $S_u$), d represents a given channel, and D represents the set of all channels. The probability function P( ) may be used to generate one or more probabilities that a given event will occur on all channels or one particular channel. For example, the recommendation system 110 may generate a user-specific probability of a future item acquisition event occurring for each combination of item and channel, or some subset thereof.

Although some examples herein refer to the input parameters for equations or processes as being the input received from particular users over particular channels, the examples are illustrative only and are not intended to be limiting, required, or exhaustive. In general, the equations and processes described herein may use any input parameters that represent the occurrence of events over particular channels. A data element or structure that represents aspects of a user interaction to initiate the acquisition of a particular item over particular channel may be the parameter that is used in the process of generating probabilities and recommendations, rather than the input that is actually received from the user to initiate such events. For example, a given input parameter may be a data structure with a data element representing an item identifier, a data element representing a user identifier, a data element representing a channel identifier, a data element representing a timestamp of a corresponding event, a data element representing some other aspect of the event, or some combination of these data elements. Such data structures may be generated based on user input that was received via certain channels to initiate certain events, but may not necessarily include the user input itself.

With reference to an illustrative embodiment, a user 104 may make utterances, such as spoken commands, queries, and the like. An utterance 102 may be in any language and any dialect. A client device 105 may capture audio of the utterance 102 via a microphone 106 and generate audio signals for processing by the event processing system 100. For example, the microphone 106 (or a component of the event processing system 100) may detect that the captured audio is associated with a purchase of the user and generate an audio signal with information regarding the captured audio. A user 104 may take further actions (e.g., purchasing an item via a web site). The further actions may be any type of non-audio-based purchase. A client device 107 may capture the actions and generate non-audio signals for processing by the event processing system 100. For example, the client device 107 may detect that the user 104 has initiated a purchase of an item via a website and generated a non-audio signal with information regarding the captured audio. The client devices 105 and 107 may each generate a plurality of signals over a period of time. For example, client device 105 may generate a plurality of audio signals associated with purchases occurring via the audio channel over the period of time and the client device 107 may generate a plurality of non-audio signals associated with purchases occurring via the non-audio channel over the same period of time or a different period of time.

The event processing system 100 may receive the outputs generated by the client devices 105 and 107 for data processing. Further, the event processing system 100 may provide information to one or more of the client devices 105 and 107 (e.g., a recommendation). The event processing system 100 may include one or more components to receive and process the outputs received from the client device 105 and 107. The event processing system 100 may further include an item catalog of items to be browsed. The event processing system 100 may include a recommendation system 110 to generate a recommendation that enables users to browse the item catalog more efficiently.

The event processing system 100 may process the signals and pass the signals, or data derived therefrom, to the recommendation system 110 to determine a first recommendation for a future potential purchase of the user via the audio channel and a second recommendation for a future potential purchase of the user via the non-audio channel, and take some action in response to the recommendations. The recommendations may be based on historical data associated with the audio channel and the non-audio channel. The event processing system 100 may provide data elements representing the occurrence of an event occurring over the respective channel to the recommendation system 110. For example, the data elements may represent the occurrence of purchase events previously occurring over multiple channels. Each recommendation may be specific to a given channel but consider inputs from multiple channels. The recommendation system 110 may subsequently provide the recommendations to the event processing system 100.

The microphone 106 and the client device 107 may be integrated with, or in wired or wireless communication with, the event processing system 100. The microphone 106 may be integrated with or in wired or wireless communication with the client device 105 separate from the event processing system 100. For example, a user may make utterances captured by the microphone 106 of a client device 105, and the client device 105 may provide a microphone 106 signal (or information derived therefrom) to the event processing system 100. The client device 105 and the client device 107 can correspond to a wide variety of electronic devices, such as a computing device that includes one or more processors and a memory which may contain software application executed by the processors. Illustratively, the client device 105 and the client device 107 may be a personal computing device, laptop computing device, handheld computing device, terminal computing device, mobile device (e.g., mobile phones or tablet computing devices), wearable device configured with network access and program execution capabilities (e.g., "smart eye-wear" or "smart watches"), wireless device, electronic reader, media player, home entertainment system, speaker configured with network access and program execution capabilities (e.g., "smart speakers"), gaming console, set-top box, television configured with network access and program execution capabilities (e.g., "smart TVs"), or some other electronic device or appliance.

In various examples, an audio signal (and metadata or other associated data) and/or a non-audio signal (and metadata or other associated data) may be sent to the event processing system 100 over one or more networks 108. The one or more networks 108 may include any viable communication technology, such as wired and/or wireless modalities and/or technologies. The one or more networks 108 may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. Any of the one or more networks 108 may include, and/or may or may not have access to and/or from, the internet.

The event processing system 100 may include various components for providing the features described herein. In some embodiments, the event processing system 100 may include various components for predicting the future intent of the user based on the signals. For example, the event processing system 100 may include an automatic speech recognition system, a natural language processing system, a natural language understanding system. Further, the event processing system 100 may include a recommendation system 110 in order to generate a recommendation based on the predicted future intent of the user. The event processing system 100 may provide data elements representing previously occurring events occurring via the multiple channels. In some embodiments, the recommendation system 110 may include a sequence encoder 112 to process events of a user received via multiple channels. The sequence encoder 112 may receive a plurality of events corresponding to inputs of the user and associated time data. For example, the inputs may correspond to purchases and the time data may correspond to time of purchase data. The sequence encoder 112 may further generate a plurality of user representations corresponding to the user.

The recommendation system 110 may further include a general event probability component 114 to receive a user representation and generate one or more general event probabilities. The one or more general event probabilities may correspond to a likelihood of occurrence of an event with respect to a particular item generally (e.g., the likelihood that the user generates a subsequent input to acquire the item, without regard to whether the acquisition will be a repeat acquisition). The recommendation system 110 may further include a weight component 116 to receive a user representation and generate one or more weights. The one or more weights may correspond to a bias towards the one or more general event probabilities and/or one or more repeated event probabilities. For example, the one or more weights may correspond to a user-bias towards the one or more general event probabilities. The recommendation system 110 may further include a repeated event probability component 118 to receive a user representation and generate one or more repeated event probabilities. The one or more repeated event probabilities may correspond to a likelihood that the user repeats a previous input. Each of the general event probability component 114, the weight component 116, and the repeated event probability component 118 may each receive a different user representation. Further, the recommendation system 110 may include a mixture component 120 to obtain the one or more general event probabilities, the one or more weights, and the one or more repeated event probabilities. The mixture component 120 may generate one or more overall event probabilities corresponding to a likelihood that the user generates an input.

The event processing system 100 and/or the recommendation system 110 may be implemented on one or more physical server computing devices that provide computing services and resources to end-user devices, such as the client device 105 or the client device 107. In some embodiments, the event processing system 100 and/or the recommendation system 110 (or individual components thereof) may be implemented on one or more host devices, such as blade servers, midrange computing devices, mainframe computers, desktop computers, or any other computing device configured to provide computing services and resources. For example, a single host device may execute one or more sequence encoders 112, general event probability components 114, weight components 116, repeated event probability components 118, mixture components 120, some combination thereof, etc. The event processing system 100 and/or the recommendation system 110 may include any number of such hosts.

In some embodiments, the features and services provided by the event processing system 100 and/or the recommendation system 110 may be implemented as web services consumable via one or more communication networks. In further embodiments, the event processing system 100 and/or the recommendation system 110 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

At [A], the user 104 can produce the utterance 102. The utterance 102 may be in response to a query, question, prompt, etc. from the client device 105 or the event processing system 100. In some implementations, the utterance 102 may be an audio-based purchase command (e.g., "Purchase 10 Acme widgets"). In some implementations, the user 104 may produce a plurality of utterances 102 over a period of time.

At [B], the microphone 106 can receive the audio representing the utterance 102 from the user 104. The microphone 106 can perform one or more operations on the audio and send the audio as an audio signal to the event processing system 100 via the network 108. The audio signal may be a recording or substantially real-time stream of the utterance 102 of the user 104 or the audio signal may include data derived from a recording or substantially real-time stream of the utterance 102 of the user 104. In some implementations, the microphone 106 may send the audio as a plurality of audio signals. For example, each audio signal of the plurality of audio signals may be associated with an audio-based purchase.

At [C], the user 104 can interact with the client device 107. The interaction may be in response to a query, question, prompt, etc. from the client device 107 or the event processing system 100. In some implementations, the interaction may be a non-audio-based purchase command (e.g., the user 104, via the client device 107, may click on a purchase link on a website). The interaction may be any non-audio-based interaction with the client device 107. In some implementations, the user 104 may produce multiple interactions with the client device 107.

At [D], the client device 107 can receive the interaction from the user 104. The client device 107 can perform one or more operations based on the interaction and generate a non-audio signal corresponding to the interaction. The client device 107 can send the interaction as a non-audio signal to the event processing system 100 via the network 108. The non-audio signal may be a representation of the interaction of the user or may include data derived from the interaction of the user 104. For example, the non-audio signal may represent a purchase of an item by the user. In some implementations, the client device 107 may receive a plurality of interactions.

At [E], the network 108 may receive the audio signal and the non-audio signal for transmission to the event processing system 100 in order to pass the signals to the recommendation system 110 for recommendation generation. The network 108 may further route the audio signal and the non-audio signal to the event processing system 100. The network 108 may route the audio signal and the non-audio signal as a plurality of signals to the event processing system 100. In some embodiments, based on the source of the signal, the network 108 may route the signal to a specific interface of the event processing system 100. For example, signals from the client device 105 may be routed to a first interface of the event processing system 100 and signals from the client device 107 may be routed to a second interface of the event processing system 100. In some embodiments, the audio signal and the non-audio signal may occur separately and/or during different time periods. For example, the network 108 may provide the audio signal to the event processing system 100 separately from the non-audio signal. Further, the network 108 may provide the audio signal at a first time to the event processing system 100 and the non-audio signal at a second time. The event processing system 100 may perform one or more operations on the audio signal and/or non-audio signal. Further, the event processing system 100 may pass the signals to the recommendation system 110 to generate a recommendation. Illustratively, the signals can be passed to sequence encoder 112 of the recommendation system 110.

At [F], the event processing system 100 may receive a plurality of audio signals occurring via the audio channel over a period of time and a plurality of non-audio signals occurring via the non-audio channel over the period of time. The event processing system 100 may subsequently initiate the recommendation system 110 to provide a recommendation in response to the plurality of audio signals and the plurality of non-audio signals. In some implementations, the recommendation system 110 may be initiated by a subsequent utterance, a subsequent browse session, or a subsequent interaction by the user 104. In other implementations, the recommendation system 110 may be initiated by the event processing system 100 based on the plurality of audio signals and the plurality of non-audio signals received by the event processing system 100. For example, the recommendation system 110 may be initiated periodically (e.g., every hour, every day, every week) or in response to a predetermined event. The event processing system 100 may continue to receive audio signals and non-audio signals subsequent to the initiation of the recommendation system 110 and the event processing system 100 may periodically initiate the recommendation system 110 based on the updated audio signals and the updated non-audio signals. The event processing system 100 may determine that a recommendation should be generated and pass the signals to the recommendation system 110. Through the recommendation system 110, the sequence encoder 112 may receive the signals and can perform a sequence encoding using the signals received at [E] in order to generate representations of the user. The sequence encoder 112 may illustratively be a multi-layer encoder including one or more of a transformation layer and a pooling layer. Illustratively, the sequence encoder 112 may receive a plurality of signals representing a plurality of inputs received from the client device 105 and the client device 107. Further, each input may be associated with associated time data. For example, the client device 105 and the client device 107 may be configured to provide time of input data with the respective signal. In some embodiments, the recommendation system 110 may add time of input data to each respective signal based on the recommendation system 110 receiving the respective signal. The representations of the user may include multiple user representations that model a general event preference, a repeated event preference, and associated weights. The user representations may be provided to multiple other components of the event processing system 100.

At [G], the user representations corresponding to the sequence encoding of the sequence encoder 112 may be provided to the general event probability component 114, the weight component 116, and the repeated event probability component 118 in order to generate a probability of a future potential event. A first user representation modeling the general event preference may be provided to the general event probability component 114. A second user representation modeling the relative weights for general event probabilities and repeated event probabilities may be provided to the weight component 116. A third user representation modeling the repeated event preference with respect to particular items may be provided to the repeated event probability component 118. In some implementations, more or less user representations may be generated by the sequence encoder 112. In some implementations, the recommendation system 110 may include more or less components to receive the user representations.

At [H], the general event probability component 114 may generate one or more general event probabilities using the respective user representation in order to determine the general likelihood that a subsequent event occurs (e.g., without considering whether the event will be a repeated event). The general event probability component 114 may generate one or more general event probabilities by processing the user representation and the inputs. The one or more general event probabilities may be based on a channel specific pattern and a channel independent pattern (e.g., a channel specific probability and a channel independent probability). For example, the one or more general event probabilities may consider a probability specific to the channel for which the recommendation is being generated and a probability independent of the channel for which the recommendation is being generated. The channel specific pattern and a channel independent pattern may be combined to generate the one or more general event probabilities. A general event probability may be generated for each potential event (e.g., an acquisition event for each available item) or some subset thereof. In some embodiments, as described in greater detail below, a general event probability for each event may be generated for each channel through which the event may occur, or some subset thereof.

At [I], the weight component 116 may generate one or more weights using the respective user representation in order to determine a weight for each of the one or more general event probabilities and the one or more repeated event probabilities. The weight component 116 may generate the one or more weights by processing the user representation. The weight component 116 may further be trained to generate a weight associated with a specific user. One or more weights may be generated for each channel, such that general event probabilities and repeated event probabilities may be weighted differently for the same user depending upon the channel. For example, users may be more likely to initiate repeated events via a voice channel than via a GUI channel due to the limited amount of information that can be exchanged in a short period of time via the voice channel, the difficulty in researching new items, etc. Thus, the weight generated for repeated events in the voice channel may be higher than the weight generated for repeated events in the GUI channel.

At [J], the repeated event probability component 118 may generate one or more repeated event probabilities using the respective user representation in order to determine the likelihood that a repeated event occurs. The repeated event probability component 118 may generate one or more repeated event probabilities by processing the user representation, the inputs, and the associated time data. Further, the one or more repeated event probabilities may be based on a channel specific pattern and a channel independent pattern in order to generate the repeated event probability. A repeated event probability may be generated for each potential event (e.g., an acquisition event for each available item) or some subset thereof. In some embodiments, as described in greater detail below, a repeated event probability for each event may be generated for each channel through which the event may occur, or some subset thereof.

At [K], the general event probability component 114 may provide one or more general event probabilities to the mixture component 120. At [L], the weight component 116 may provide the one or more weights to the mixture component 120. At [M], the repeated event probability component 114 may provide one or more repeated event probabilities to the mixture component 120.

At [N], the mixture component 120 can generate one or more overall event probabilities based on the one or more general event probabilities, the one or more repeated event probabilities, and the one or more weights. The mixture component 120 may associate each of the weights with one of the general event probability or the repeated event probability to generate a weighted general event probability and a weighted repeated event probability. In some implementations, the mixture component 120 may receive a weight for only one of the general event probability or the repeated event probability. Based on the weighted general event probability and the weighted repeated probability, the mixture component can generate the overall event probability.

At [O], the mixture component 120 may provide the one or more overall event probabilities to the recommendation system 110 in order to generate a recommendation for the user. The recommendation system 110 may use the one or more overall event probabilities to determine a probabilistic future event for the user for a specific channel (i.e., a recommendation). Further, probabilistic future events may be determined for each channel. The recommendation system 110 may then provide the recommendation to the event processing system 100. The event processing system 100 may cause a response to the recommendation. For example, systems may be prepared to receive an input corresponding to the recommendation. Further, the recommendation may be presented to the user to initiate the event via one or more of the client devices 105 or 107 or any other device.

The recommendation system 110 may further receive additional signals after generating the recommendation. The additional signals may correspond to additional items associated with the user (e.g., purchase data). The recommendation system 110 may determine a subsequent recommendation based at least in part on the additional signals.

Figure 2:
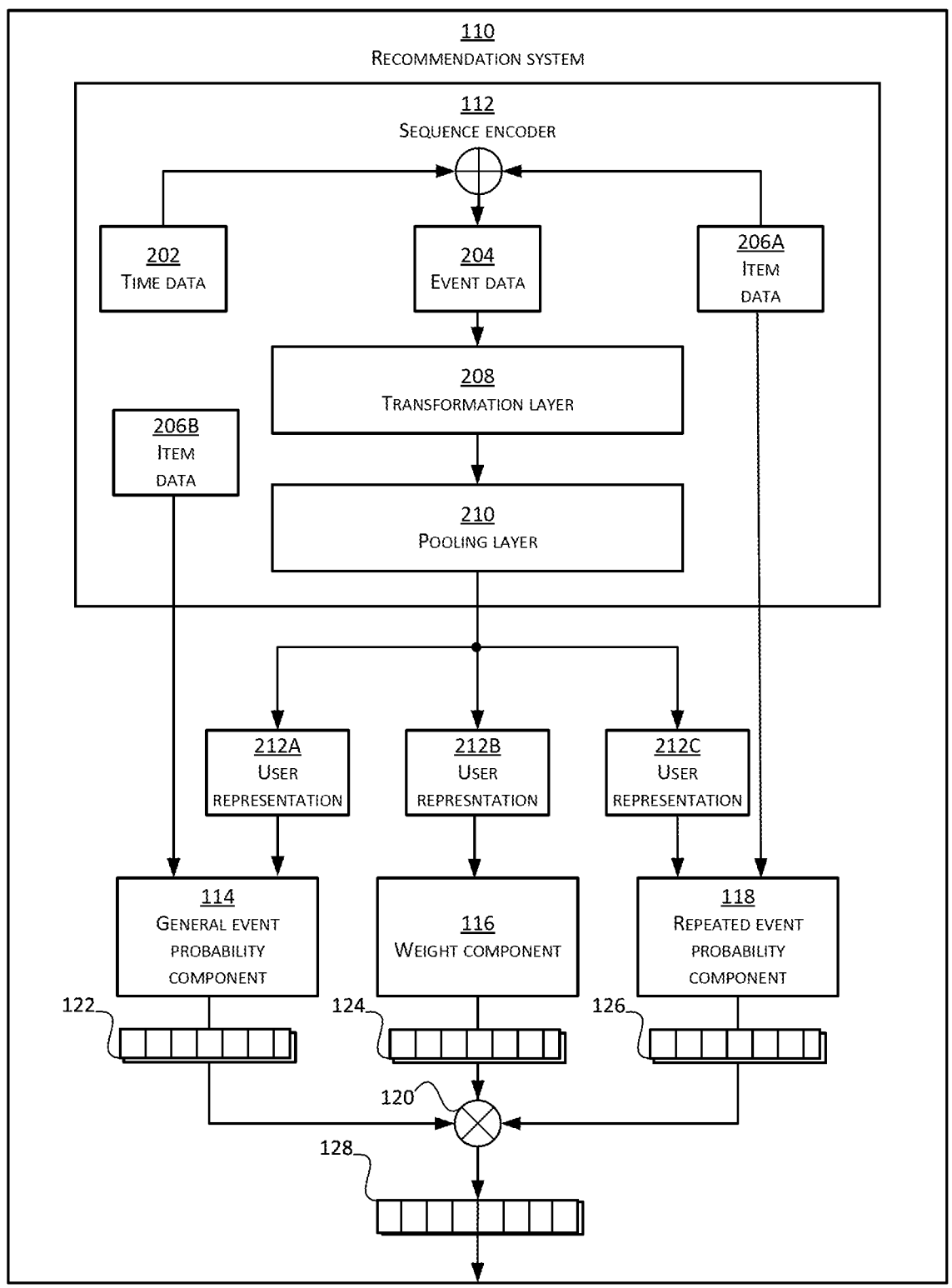
FIG. 2 depicts a schematic diagram of a recommendation system, including a multi-layered sequence encoder in accordance with aspects of the present disclosure.

FIG. 2 depicts a schematic diagram 200 of a recommendation system 110 in order to generate a recommendation for a user based on data regarding previous events. The recommendation system 110 may include a sequence encoder 112. In some embodiments, the sequence encoder 112 may be implemented as a multi-layered neural network. The sequence encoder 112 may include one or more of a: transformation layer 208 and pooling layer 210. The sequence encoder 112 may further include one or more layers for combining item data with time data to generate event data. The sequence encoder 112 may generate multiple event-based user representations for the recommendation system 110 in order to generate a recommendation for the user regarding a potential future event.

The sequence encoder 112 may receive time data 202 and item data 206A in order to determine events associated with a user. The item data 206A may be a subset of item data 206B, where item data 206B may represent items of an item catalog, some or all of which are the subject of events corresponding to a plurality of inputs received over a time range. The time data 202 may include a respective time for each of the events. Further, each portion of the time data 202 may correspond to a given item of the item data 206A. The time data 202 and the item data 206A may correspond to events occurring via multiple channels (e.g., an audio channel and a non-audio channel). In some implementations, the sequence encoder 112 may receive a first set of item data 206A and time data 202 regarding events occurring via a first channel and a second set of item data 206A and time data 202 regarding events occurring via a second channel. Further, the sequence encoder 112 may combine the sets of item data 206A and the sets of time data 202.

The sequence encoder 112 may further include one or more embedding layers in order to combine the time data 202 and item data 206A into embedded representations of the event data 204. Each input from the item data 206A—or an encoded representation thereof—may be combined with a respective time from the time data 202—or an encoded representation thereof—in order to generate an element of the event data 204 representing a particular event. The item data 206A and the time data 202 may be concatenated, combined, appended, or otherwise joined in order to generate the event data 204. In some embodiments, an element of item data 206A and a corresponding element of time data 202 may be used to generate an event embedding element of the event data 204. For example, an encoded representation of an element of item data 206A may be obtained through an embedding lookup in which a pre-trained item embedding is obtained for the element of item data 206A. Similarly, an encoded representation of an element of time data 202 may be obtained through an embedding lookup in which a pre-trained time embedding is obtained for the element of time data 202.

In some embodiments, an item represented by an element of item data 206A may be associated with multiple categories within an item catalog or item taxonomy, and the encoded representation of the item may be based on embeddings for each of the associated categories (or some subset thereof). Equation 2 provides one expression of item embedding data in which the embedding for a particular input is determined as a combination of embeddings associated with an item that is the subject of the input.

$$V_j = \sum_{l=1}^{L} V_j^{(l)}$$

EQUATION 2

In Equation 2, $v_j$ may represent the embedding of a given item (e.g., an item that is the subject of an acquisition event), L may represent the set of different categories l associated with the item in a catalog or taxonomy of items, and $V_j^{(l)}$ may represent a pre-trained embedding of a given category of the item. In Equation 2, the embedding of a given item is determined as the sum of embeddings of corresponding categories of the item.

In some embodiments, a timestamp represented by an element of time data 202 may be encoded based on an offset relative to some reference time, rather than on the absolute time of the timestamp itself. Equation 3 provides one expression of time embedding data in which timestamps are represented as relative rather than absolute timestamps before being mapped to particular embeddings.

$$t_{u,i} = \tau(t_k - t_{u,i}) \quad \text{EQUATION 3}$$

In Equation 3, $t_{u,i}$ may represent the embedding of given time data for the ith timestamp, $\tau$ may represent an embedding lookup layer, and $t_{u,i}$ may represent the time of the ith input as the difference with respect to a reference time point. Illustratively, the difference may be represented in terms of a quantity of units of time, such as days, weeks, or months. Representing time in terms of relative offset rather than absolute points in time allows for mapping of the timestamps to pre-trained embeddings, so as to more easily generalize modelling the temporal effect of past events.

To generate encoded representations of individual events, the encoded item representation and encoded time representation generated for the item and time associated with the event may be combined into a single encoded event representation. Equation 4 provides one expression of event embedding data as a combination of item embeddings and time embeddings representing the item and time of the subject event.

$$e_{u,i} = v_{u,i} + t_{u,i} \quad \text{EQUATION 4}$$

In Equation 4, $e_{u,i}$ may represent the embedding of event data for the ith event. $t_{u,i}$ may represent the embedding of given time data. $v_{u,i}$ may represent the embedding of a given item.

In some embodiments, the item data 206A and the time data 202 may be received by a system other than the sequence encoder 112, including a system outside of the recommendation system 110, for combination. Further, the sequence encoder 112 may receive the event data 204 as an input. The event data 204 may be provided to other components of the sequence encoder 112 for processing.

The sequence encoder 112 may further include a transformation layer 208 in order to learn and model dependencies between multiple events for a given user. In some embodiments, the transformation layer 208 may correspond to one or more layers of a neural network. The transformation layer 208 may be configured to receive event data and generate one or more representations for each event of the event data based on corresponding dependencies. The transformation layer 208 may further capture the dependency between inputs based on the prior embedding by the one or more embedding layers of the sequence encoder 112. In some embodiments, the transformation layer 208 may be based on a multi-head attention scheme and each head may consider a different group of events to be relevant. In such a mechanism, each head may be combined (e.g., concatenated) to determine dependencies between the events. Equations 5-10 provide expressions for a multi-head attention mechanism for learning the dependencies between events.

$$MH(E) = [\text{head}_1, \text{head}_2, \ldots, \text{head}_h] W^O \quad \text{EQUATION 5}$$

$$\text{head}_i = \text{Attention}(EW_i^Q, EW_i^K, EW_i^V, m/h) \quad \text{EQUATION 6}$$

$$\text{Attention}(Q,K,V,m) = \text{Softmax}(QK^T/\sqrt{m})V \quad \text{EQUATION 7}$$

$$A = \text{LayerNorm}(E + \text{Dropout}(MH(E))) \quad \text{EQUATION 8}$$

$$S = \text{Dropout}(\sigma^F(AW_1^F + b_1^F))W_2^F + b_2^F \quad \text{EQUATION 9}$$

$$F = \text{LayerNorm}(A + \text{Dropout}(S)) \quad \text{EQUATION 10}$$

In Equations 5, 6, and 7, MR may represent the multi-head self-attention mechanism, E may represent the set of events, each head and h may represent attention heads that learn a specific dependency relationship within the sequence, $W^O$ may represent the output projection matrix for the combined heads, $W_i^Q$, $W_i^K$, and $W_i^V$, may represent projection matrices for each head, Q, K, and V may represent matrices, m may represent a scaling factor. Equation 7 may represent an attention function. In Equations 8, 9, and 10 may each represent an output of a feed-forward layer. $M_1^F$ and $W_2^F$ may represent parameter matrices. $b_1^F$ and $b_2^F$ may represent bias terms. E may represent the set of events and MR may represent the multi-head self-attenuation mechanism. $\sigma^F$ may represent a nonlinearity.

The features of the transformation layer 208 described herein are provided for illustration only, and are not intended to be required, exhaustive, or limiting of the transformation layer features that may be implemented. In some embodiments, a different transformation layer 208 may be used, or individual features of the transformation layer 208 may differ from those set forth herein.

The sequence encoder 112 may further include a pooling layer 210 in order to generate different types of user representations, such as those modelling a general event preference, a repeated event preference, and one or more weights. The pooling layer 210 may correspond to one or more layers of a neural network. The pooling layer 210 may be configured to receive the output of the transformation layer 208 as illustratively seen in Equations 8, 9, and 10. The pooling layer 210 may generate the different types of user representations by reducing the size and/or quantity of the output of the transformation layer 208. The pooling layer 210 may use any type of pooling such as max pooling, average pooling, etc. The pooling layer 208 may further operate separately on multiple outputs of the transformation layer 208 to generate user representations based on the output of the transformation layer 208. Equation 11 provides an expression for generating the user representations in one embodiment.

$$u^{\div} = [u^p, u^q, u^\pi]^T = F^T \text{Dropout}(\text{Softmax}(\text{Dropout}(\sigma^P (FW_1^P)))W_2^P)) \quad \text{EQUATION 11}$$

In Equation 11, $u^p$, $u^q$, and $u^\pi$ may represent the encoded user representations generated by the pooling layer 210. In some embodiments, $u^p$, $u^q$, and $u^\pi$ model the general preference, repeated purchase preference, and their relative importance for recommendation, respectively. $\sigma^P$ may represent a nonlinearity, F may represent the output of the transformation layer and T may represent time data. $W_1^P$ and $W_2^P$ may represent parameter matrices.

The pooling layer 210 may generate the user representations 212A, 212B, and 212C to be provided as an output of the sequence encoder. The pooling layer 210 may generate a user representation 212A for determining a general event preference, a user representation 212B for determining one or more weights, and a user representation 212C for determining a repeated event preference. Each of the user representations 212A, 212B, and 212C may be provided by the sequence encoder 112 to a subsequent component of the recommendation system 110. The user representation 212A may be provided with the item data 206B to a general event probability component 114. The user representation 212B may be provided to a weight component 116. The user representation 212C may be provided with the item data 206A to a repeated event probability component 118.

The general event probability component 114 may generate a plurality of general event probabilities 122 for each channel of item data 206A. For example, if item data 206A is received from an audio and a non-audio channel, the plurality of general event probabilities 122 may be produced by the general event probability component 114 for each of the audio channel and the non-audio channel. The repeated event probability component 118 may generate a plurality of repeated event probabilities 126 for each channel of item data 206B. Further, the weight component 116 may generate one or more weights 124 for each channel.

The mixture component 120 may receive the plurality of general event probabilities 122, the plurality of repeated event probabilities 126, and the one or more weights 124 to generate a plurality of overall event probabilities 128. The mixture component 120 may generate a plurality of overall event probabilities 128 for each channel. The mixture component 120 may weigh the plurality of repeated event probabilities 126 and the plurality of general event probabilities 122 according to the one or more weights 124 to generate one or more of a plurality of weighted repeated event probabilities and a plurality of weighted general event probabilities. Further, the mixture component 120 may combine the plurality of weighted repeated event probabilities and the plurality of weighted general event probabilities in order to generate a plurality of overall event probabilities 128. The plurality of overall event probabilities 128 may then be used to determine a recommendation as the output of the recommendation system 110. In some implementations, the plurality of overall event probabilities 128 may be provided as the output of the recommendation system 110.

Figure 3:
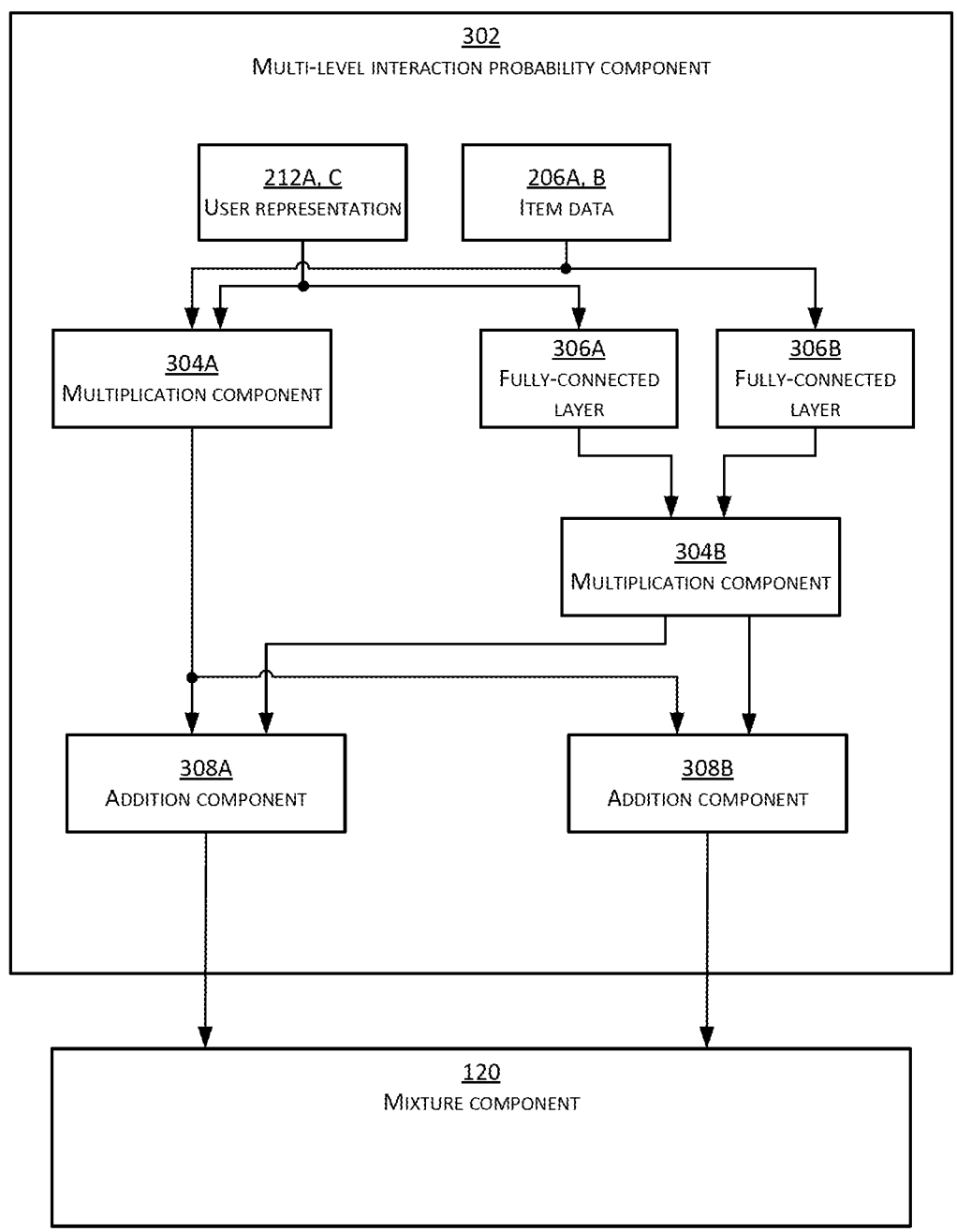
FIG. 3 depicts a schematic diagram of a multi-level interaction probability component, including multiplication components, fully-connected layers, and addition components in accordance with aspects of the present disclosure.

FIG. 3 depicts a schematic diagram 300 of a multi-level interaction probability component 302 in order to generate a plurality of probabilities for multiple channels. The multi-level interaction probability component 302 may generate a plurality of probabilities for a first channel (e.g., an audio channel) and a plurality of probabilities for a second channel (e.g., a non-audio channel). Further, the multi-level interaction probability component 302 may correspond to one or more of the general event probability component 114 or the repeated event probability component 118 as seen in FIGS. 1 and 2. Where the multi-level interaction probability component 302 is implemented as the general event probability component 114, the plurality of probabilities generated by the multi-level interaction probability component 302 may include an event probability for each possible item in an item catalog. One or more items of the item catalog may include items corresponding to events associated with the user. Further, one or more items of the item catalog may include items not corresponding to events associated with the user. A set of the probabilities for the general event probability component 114 is generated for each channel. For example, if the item catalog contains 1,000 items and there are 2 channels, the general event probability component 114 may generate 2,000 probabilities. Where the multi-level interaction probability component 302 is implemented as the repeated event probability component 118, the plurality of probabilities generated by the multi-level interaction probability component 302 may include one or more probabilities for one or more items previously corresponding to the user (e.g., items previously purchased by the user). In some embodiments, the plurality of probabilities generated by the repeated event probability component 118 may include a probability for each item of the item catalog that corresponds to the user. A set of the probabilities for the repeated event probability component 118 is generated for each channel. For example, if the user has previously purchased five items and there are 2 channels, the repeated event probability component 118 may generate 10 probabilities.

The multi-level interaction probability component 302 may include one or more of: multiplication components 304A and 304B, fully-connected layers 306A and 306B, and addition components 308A and 308B. The output of the multi-level interaction probability component 302 may further be provided to the mixture component 120.

The multi-level interaction probability component 302 may determine a channel specific pattern and a channel independent pattern for each of a series of possible future events. Further, the channel specific pattern and a channel independent pattern may be combined in order to generate the output of the multi-level interaction probability component 302. The multi-level interaction probability component 302 may receive one or more of a user representation 212A or a user representation 212C (as seen in FIG. 2) and one or more of item data 206A or item data 206B to generate the channel specific pattern and a channel independent pattern. When the multi-level interaction probability component 302 corresponds to the general event probability component 114, the multi-level interaction probability component 302 may receive the user representation 212A and the item data 206B. When the multi-level interaction probability component 302 corresponds to the repeated event probability component 118, the multi-level interaction probability component 302 may receive the user representation 212C and the item data 206A.

The multi-level interaction probability component 302 may include various components to combine, compress, classify, and otherwise process the data that is provided. In some embodiments, as shown in FIG. 3, the multi-level interaction probability component 302 may include a component to combine data, such as a multiplication component 304A, and one or more components to generate low-dimensional representations of data, such as fully-connected layers 306A and 306B configured to receive one or more of the user representation 212A or the user representation 212C and one or more of the item data 206A or the item data 206B. The multiplication component 304A may determine a dot product of the user representation 212A or 212C and individual elements of the item data 206A or 206B (depending upon the implementation of the multi-level interaction probability component 302). The multiplication component 304A may generate a plurality of dot products for each of a plurality of possible inputs of the user. A plurality of dot products may be generated for each channel associated with the multi-level interaction probability component 302. Further, the plurality of dot products may be associated with a channel independent pattern (i.e., channel independent preference) of the user for a given input. In some embodiments, the multiplication component 304A may perform any other type of multiplication or other combination of multiple data elements into a single data element. The multi-level interaction probability component 302 may further include fully-connected layers 306A and 306B configured to receive the user representation 212A or 212C and the item data 206A or 206B. The fully-connected layers 306A and 306B may correspond to one or more layers of a neural network that generates compressed representations (e.g., low-dimensional vectors) of the user and/or the item representations. The fully-connected layers 306A and 306B may classify the user representation 212A or 212C and the item data 206A or 206B. The fully-connected layers 306A and 306B may each operate on flattened input (the user representation 212A or 212C and the item data 206A or 206B) and optimize objectives of the multi-level interaction probability component 302. The fully-connected layers 306A and 306B may generate an optimized representation of the user representation 212A or 212C and the item data 206A or 206B for further operations.

The multi-level interaction probability component 302 may further include a multiplication component 304B to receive the optimized representations of the user representation 212A or 212C and the item data 206A or 206B. The multiplication component 304B may generate a tri-factor product of the optimized representations of the user representation 212A or 212C and the item data 206A or 206B and matrix of trainable parameters associated with each channel. A plurality of tri-factor products—also referred to as factors—may be generated for each channel and may further represent a channel specific pattern (i.e., channel specific preference) of the user for a given possible input.

The multi-level interaction probability component 302 may further include addition components 308A and 308B to receive the plurality of tri-factor products and the plurality of dot products. The tri-factor products and the dot products may also be referred to as "factors" such that the tri-factor products comprise channel-specific factors representing channel-specific event patterns, and the dot products comprises channel-independent factors representing channel-independent event patterns. The addition components 308A and 308B may augment the channel-specific factors represented by the tri-factor products with channel-independent factors represented by the dot products to generate augmented interaction factors. The addition components 308A and 308B may then use the augmented interaction factors as described in greater detail below to generate a plurality of probabilities for each channel. In this way, generating probabilities based on the channel-specific factors will also consider channel-independent factors, thereby providing a transfer of channel-independent learning to augment the channel-specific determinations.

Each addition component 308A and 308B may correspond to a different channel. For example, addition component 308A may generate a plurality of probabilities for the audio channel and addition component 308B may generate a plurality of probabilities for the non-audio channel. The addition components 308A and 308B may determine a combination of the channel specific factor and a channel independent factor associated with the user for a given item.

Equations 12 and 13 provide an expression for generating the augmented interaction factors as combinations of the channel specific factor and a channel independent factor. Equation 12 provides an expression for the general event probability component and Equation 13 provides an expression for the repeated event probability component.

$$b_{i,j}^{d,p} = u^p v_j^T + \tilde{u}^p W^{d,p} \tilde{v}_j^T \quad \text{EQUATION 12}$$

$$b_{u,(u,i)}^{d,q} = u_q v_{u,i}^T + \tilde{u}^q W^{d,q} \tilde{v}_{u,i}^T \quad \text{EQUATION 13}$$

In Equations 12 and 13, the augmented interaction factors $b_{i,j}^{d,p}$ and $b_{u,(u,i)}^{d,q}$ may represent the sum of channel-independent factors (e.g., dot products) and channel-specific factors (e.g., the tri-factor products) computed the addition component. $u^p$ and $u^q$ may represent the user representation generated by the pooling layer 210 and $\tilde{U}^p$ and $\tilde{U}^q$ may represent a low-dimensional vector derived from $u^p$ and $u^q$. $W^{d,p}$ and $W^{d,q}$ may represent interaction matrices with trainable parameters, the trainable parameters trained during the training of the recommendation model. In some embodiments, the trainable parameters may be weights. Each of $W^{d,p}$ and $W^{d,q}$ may represent an interaction matrix associated with a specific channel d. $v_j^T$ and $v_{u,i}^T$ may represent item data 206B and 206A, respectively, and $\tilde{v}_j^T$ and $\tilde{v}_{u,i}^T$ may represent a low-dimensional vector derived from $v_j^T$ and $v_{u,i}^T$.

For the repeated probability event component, the multi-level interaction probability component 302 may further the time of the previous events. For example, the multi-level interaction probability component 302 may determine a time bias associated with each event. Equation 14 provides an expression for determining the time bias.

$$g_{u,i} = T(t_k - t_{u,i}) \quad \text{EQUATION 14}$$

In Equation 14, $g_{u,i}$ may represent the time bias for a given input. T may represent a learnable scalar function which can be represented by an embedding lookup layer. $t_k$ may represent the time of prediction and $t_{u,i}$ may represent the time of a given event. The multi-level interaction probability component 302 may further use the time bias in order to determine one or more repeated event probabilities. Equations 15 and 16 provide expressions for determining a distribution of repeated event probabilities over historical events, and determining the one or more repeated event probabilities using the distribution.

$$q_{u,(u,i)}^d = \frac{\exp(b_{u,(u,i)}^{d,q} + g_{u,i})}{\sum_{l=1}^{n_u} \exp(b_{u,(u,l)}^{d,q} + g_{u,l})} \quad \text{EQUATION 15}$$

$$q_{u,j}^d \sum_{i=1}^{n_u} I_{(v_j = v_{(u,i)})} q_{u,(u,l)}^d \quad \text{EQUATION 16}$$

In Equations 15 and 16, $q_{u,(u,i)}^d$ and $q_{u,j}^d$ may represent a repeated event probability of the one or more repeated event probabilities. $g_{u,i}$ and $g_{u,l}$ may represent the time bias. $B_{u,(u,l)}^{d,q}$ and $b_{u,(u,i)}^{d,q}$ may represent the sum of the addition component. I may represent an indicator function that may return a logical one if the statement is true and a logical zero otherwise. The indicator function may be used to determine whether an event would be a repeated event and should therefore be considered when determining repeated event probabilities (e.g., 1 if the item represented by vj is the same item $v_{(u,i)}$ that is the subject of a prior event associated with user u.)

The multi-level interaction probability component 302 may further determine a general event probability that a given item, of a plurality of possible items, is the subset of a future event associate with the user. Equation 17 provides an expression for determining one or more general event probabilities for each item.

$$\hat{p}_u^d = \text{Softmax}([b_{u,1}^{d,p}, \ldots, b_{u,|V|}^{d,p}]) \quad \text{EQUATION 17}$$

In Equation 17, $\hat{p}_u^d$ may represent a general event probability of the one or more general event probabilities for a given item. $b_{u,1}^{d,p}, \ldots, b_{i,|V|}^{d,p}$ may represent a plurality of event patterns for given items.

The multi-level interaction probability component 302 may further provide the plurality of general event probabilities and the plurality of repeated event probabilities to a mixture component to determine probabilities corresponding to each channel. The mixture component 120 may combine the plurality of general event probabilities and the plurality of repeated event probabilities with one or more weights to generate a plurality of overall event probabilities for each channel. Equation 18 provides an expression for determining the overall event probability for each possible input.

$$p_u^d = \pi_u^d q_u^d + (1 - \pi \pi_u^d) \dot{p}_u^d \qquad \text{EQUATION 18}$$

In Equation 18, $p_u^d$ may represent an overall event probability of the one or more overall event probabilities for a given possible input. $q_u^d$ may represent a repeated event probability of the one or more repeated event probabilities and $\dot{p}_u^d$ may represent a general event probability of the one or more general event probabilities. $\pi_u^d$ may represent the one or more weights. In determining the one or more weights, a weight component may determine a time-recency bias. Equations 19 and 20 provide expressions for determining the time recency bias and the one or more weights.

$$h_u = S(t_k - t_{u,n_u}) \qquad \text{EQUATION 19}$$

$$\pi_u^d = \frac{\exp(w^{d,\pi} u^\pi + b^{d,\pi} + h_u)}{1 + \exp(w^{d,\pi} u^\pi + b^{d,\pi} + h_u)} \qquad \text{EQUATION 20}$$

In Equation 19, $h_u$ may represent the time-recency bias for a given input. S may represent a learnable scalar function. $t_k$ may represent the time of prediction and $t_{u,nu}$ may represent the time of a given event. In Equation 20, $w^{d,\pi}$ and $b^{d,\pi}$ represent parameters to be learned during the training of the recommendation system. $h_u$ may represent the time-recency bias for a given input. $\pi_u^d$ may represent the one or more weights. $u^\pi$ may represent the user representation.

During training of the recommendation system, a loss function based on determining the overall event probabilities may be evaluated. Equation 21 provides an expression of an example loss function that may be used in some embodiments.

$$L = \sum_{d=1}^{|D|} a^d \sum_{u \in U} \sum_{j=1}^{|V|} c_{u,j}^d \log(p_{u,j}^d) \qquad \text{EQUATION 21}$$

In Equation 21, L may represent the loss function. D may represent the set of channels, V may represent the set of products, and U may represent the set of user representations. $a^d$ may represent a hyperparameter. $c_{u,j}^d$ may represent the normalized empirical frequency of observed events on a given channel. $p_{u,j}^d$ may represent an overall event probability of the one or more overall event probabilities for a given channel, a given user representation, and a given possible input.

Figure 4A:
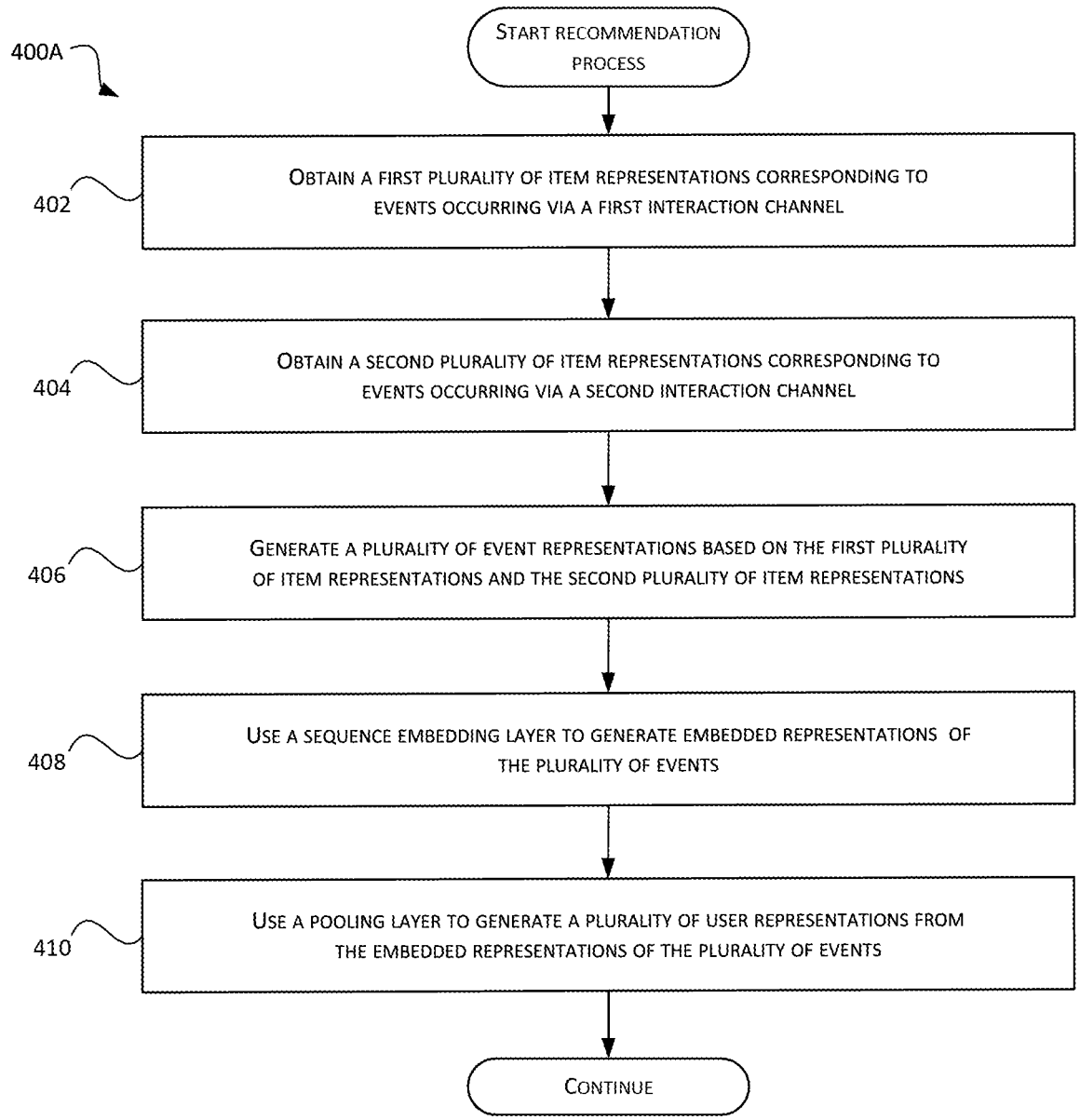
FIG. 4A is a flowchart of an example routine for implementing a recommendation system using input from multiple interaction channels according to some embodiments.

FIG. 4A describes an illustrative process 400A for determining a recommendation for a possible future event using a recommendation system trained to determine the probability of a possible future event using inputs from multiple channels. The probability of a possible future event may be determined for each of the multiple channels. Further, a plurality of probabilities, each corresponding to a possible future event, may be determined for each of the multiple channels. By using input from the multiple channels, the recommendation system may leverage information about event history over a complete range of possible channels, thereby providing more information from which a recommendation may be made. This may be particularly useful when the amount of information regarding events occurring via one channel is not sufficient or desirable to be used alone in making recommendations.

The process 400A begins at block 402. The process 400A may begin automatically upon initiation of a recommendation system. The process 400A may be embodied in a set of executable program instructions stored on a computer-readable medium, such as one or more disk drives, of a computing system of the recommendation system. When the process 400A is initiated, the executable program instructions can be loaded into memory, such as RAM, and executed by one or more processors of the computing system. Upon initiation of the recommendation process, at block 402, the recommendation system may obtain a first plurality of item representations (e.g., inputs, data elements) corresponding to events of a user occurring via a first interaction channel. For example, the plurality of items may correspond to actions taken by the user such as purchase requests and the first plurality of item representations may correspond to representations of the actions. In some embodiments, the first interaction channel may correspond to an audio channel.

At block 404, the recommendation system may obtain a second plurality of item representations (e.g., inputs) corresponding to events of the user occurring via a second interaction channel. The second interaction channel may correspond to a different type of channel than the first interaction channel. For example, the first interaction channel may correspond to an audio channel and the second interaction channel may correspond to a non-audio channel. In some embodiments, the recommendation system may obtain item representations corresponding to events of the user occurring via more than two interaction channels.

At block 406, a plurality of event representations may be generated based on the first plurality of item representations and the second plurality of item representations. In some embodiments, the plurality of event representations may be generated by combining each item representation of the first plurality of item representations and the second plurality of item representations with associated time data. For example, each item representation may be associated with time data indicating when the item representation was generated. Further, where the item representations correspond to purchases, each item representation may be associated with time of purchase data. The time data may represent an amount of elapsed time with respect to a reference time. For example, the time data may represent a relative time offset in terms of a quantity of time units, where the units may be minutes, hours, days, weeks, months, etc. In some embodiments, each item representation may be combined with more or less information. In some embodiments, each item representation may be combined with more or less time data. For example, each item representation may be combined with one or more of the day, the hour, the minute, and the second of the event associated with the item. Each item representation may be combined with time data via any combination process such as concatenating the item representation and time data, appending the item representation with the time data, etc.

At block 408, the plurality of event representations may be provided to a sequence embedding layer to generate embedded representations of the plurality of events. In some embodiments, the sequence embedding layer may correspond to a standard neural network layer. The embedded representations may provide an embedded representation of each event corresponding to a sequence that represents the given event. Further, the embedded representations may be provided to a transformation layer in order to further learn user representations based on the embedded representations. In some embodiments, the transformation layer may correspond to a multi-head self-attention mechanism in order to learn dependencies between events of the plurality of events.

At block 410, the embedded representations may be provided to a pooling layer to generate a plurality of user representations of the plurality of events. In some embodiments, the pooling layer may correspond to any conventional pooling layer. The user representations may model the general user preference, the repeated user preference, and one or more weights. The user representations may be generated for each channel of the multiple channels. The process 400A may further continue in FIG. 4B at block 412.

Figure 4B:
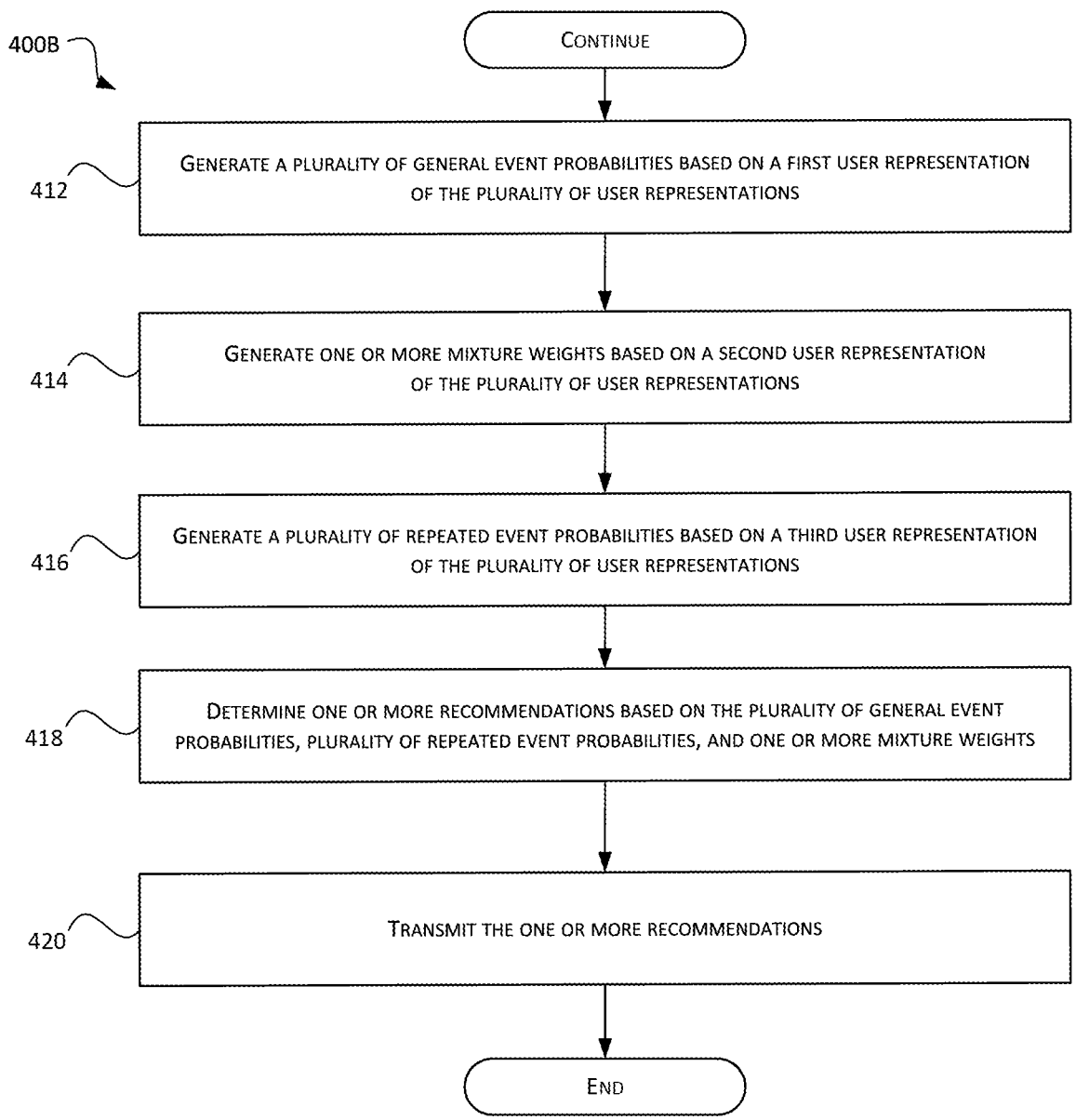
FIG. 4B is a flowchart of an example routine for implementing a recommendation system using input from multiple interaction channels according to some embodiments.

FIG. 4B describes an illustrative process 400B for further determining a recommendation for a possible future event using a recommendation system trained to determine one or more probabilities of a possible future event using input from multiple channels. FIG. 4B represents a continuation of the illustrative process 400A of FIG. 4A.

The process 400B begins at block 412. At block 412, the recommendation system may generate a plurality of general event probabilities based on a first user representation of the plurality of user representations. The plurality of general event probabilities may be further based on item representations. The plurality of general event probabilities may correspond to the probability that a subsequent item representation corresponding to the user and received by the system is a given item representation. The plurality of general event probabilities may correspond to a plurality of item representations corresponding to a plurality of items within an item catalog. The plurality of item representations may not be limited to item representations corresponding to events previously occurring with respect to the user. For example, one or more of the plurality of item representations may correspond to events previously occurring with respect to the user and one or more of the plurality of item representations may correspond to events not previously occurring with respect to the user. The recommendation system may further generate a plurality of general event probabilities for each channel of the multiple channels.

At block 414, the recommendation system may generate one or more weights based on a second user representation of the plurality of user representations. The one or more weights may correspond to a bias or weight, for a specific channel, associated with one or more of the plurality of general event probabilities and/or a plurality of repeated event probabilities.

At block 416, the recommendation system may generate the plurality of repeated event probabilities based on a third user representation of the plurality of user representations in order to generate a probability that an event is repeated. The plurality of repeated event probabilities may be further based on item representations corresponding to previously-occurring events associated with the user and the time-recency bias of a user. The plurality of repeated event probabilities may correspond to the probability that a subsequent item representation corresponding to the user and received by the system is a repeated item representation. The plurality of repeated event probabilities may correspond to the first plurality of item representations and the second plurality of item representations. The plurality of repeated event probabilities may further correspond to the probability that a given item representation of the first plurality of item representations and the second plurality of item representations is subsequently received by the recommendation system. The recommendation system may further generate a plurality of repeated event probabilities for each channel of the multiple channels.

At block 418, the recommendation system may determine one or more recommendations based on the plurality of general event probabilities, the plurality of repeated event probabilities, and the one or more weights for each channel of the multiple channels. The one or more recommendations may correspond to one or more future potential events. The recommendation system may further generate a plurality of weighted general event probabilities and a plurality of weighted repeated event probabilities based on the plurality of general event probabilities and the plurality of repeated event probabilities. The recommendation system may further generate a plurality of overall event probabilities based on the plurality of weighted general event probabilities and the plurality of weighted repeated event probabilities. The recommendation may determine the one or more recommendations based on the plurality of overall event probabilities. In some embodiments, the one or more recommendations may be based on the probabilities of the plurality of overall event probabilities that are the highest. In other embodiments, the one or more recommendations may be based on other factors (e.g., a time-recency bias, user bias, etc.).

At block 420, the recommendation system transmits the one or more recommendations. The one or more recommendations may be transmitted to the user, a data store, and/or other systems for further analysis. In some embodiments, the recommendation system may transmit the one or more recommendations to the user as a recommendation to perform the associated potential event. In some embodiments, the recommendation system may further cause a system to prepare for the potential event. For example, if the potential event is the purchase of a widget, the recommendation system may cause systems to prepare for the purchase of the widget (e.g., by preparing for shipping of the widget or by verifying that the user is able to purchase the widget).

Figure 5:
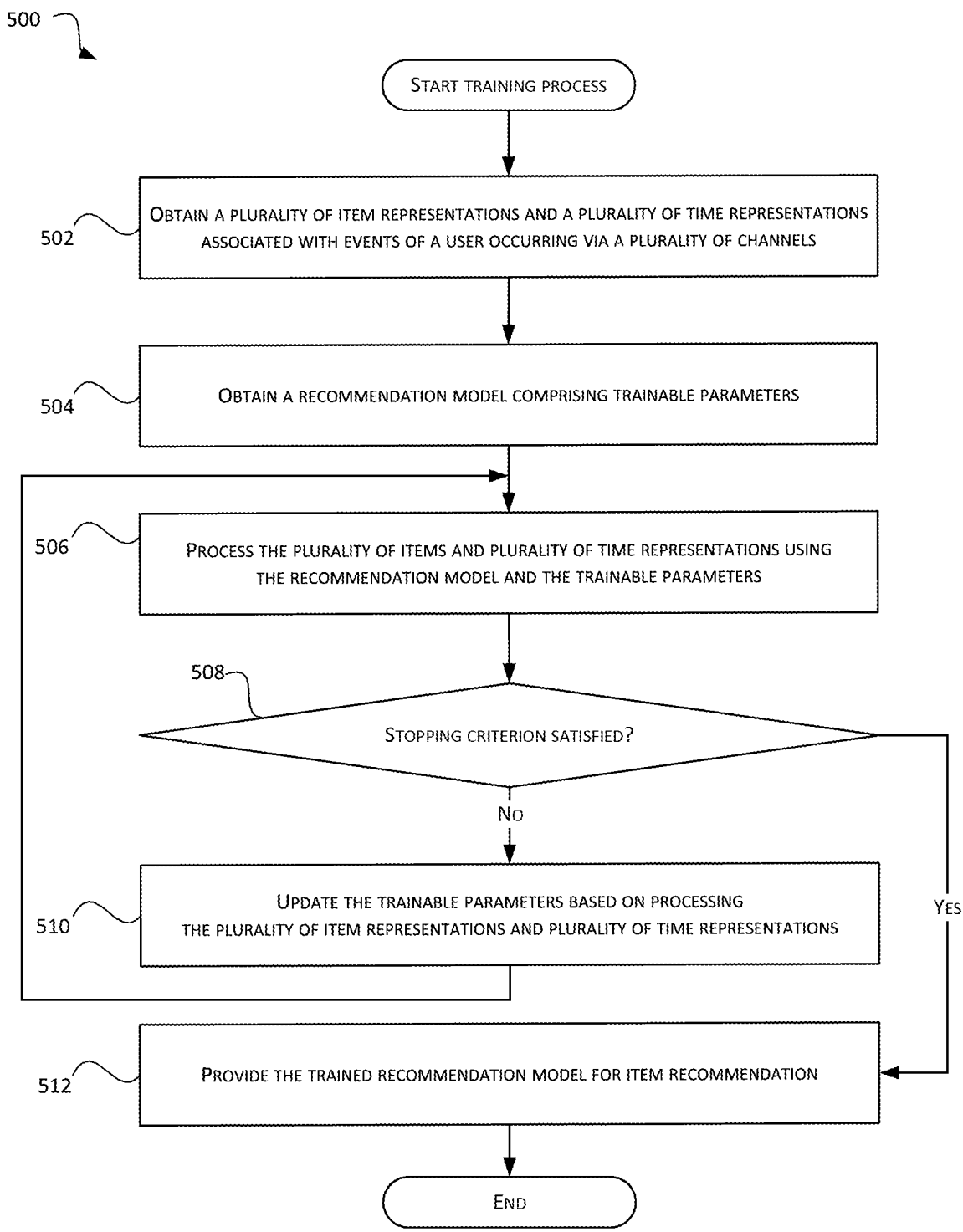
FIG. 5 is a flowchart of an example routine for training a recommendation system using multi-channel input according to some embodiments.

FIG. 5 describes an illustrative process 500 for training a recommendation system. The process 500 includes training a recommendation system based on inputs received from multiple channels (e.g., an audio channel and a non-audio channel). By such training, the trained recommendation system is trained to associate weights with different channels. Further, the trained recommendation system is trained to associate the weights with different users. Advantageously, the trained recommendation system is able to produce recommendations with a higher level of accuracy.

At block 502, the recommendation system may obtain a plurality of item representations corresponding to a first interaction channel and a second interaction channel (e.g., an audio channel and a non-audio channel). Each of the plurality of item representations may corresponding to a respective previous event, the respective previous event including time data. In some implementations, the plurality of item representations may correspond to a plurality of channels. In some implementations, the plurality of item representations may correspond to one or more audio channels and one or more non-audio channels. The plurality of item representations may further correspond to a plurality of inputs by a user. In some embodiments, the plurality of input representations may include a corpus of the most commonly observed item representations with regards to the given channel. For example, the plurality of item representations may include item representations most commonly observed with respect to one or more of the audio channel or the non-audio channel.

At block 504, a recommendation model is obtained. The recommendation model may comprise trainable parameters. Further, the trainable parameters may include one or more weights associated with a given channel or with a given user. Further, the trainable parameters may include one or more weights corresponding to a user bias towards a new event occurring and/or one or more weights corresponding to a user bias towards an event repeating. The recommendation model may further correspond to a previously trained recommendation model or to an untrained recommendation model.

At block 506, the recommendation model trains the recommendation model by processing the plurality of item representations using the recommendation model and the trainable parameters. The recommendation model may be trained to determine probabilities for each of a plurality of potential events based on the plurality of item representations. The recommendation model may determine probabilities for each of the plurality of potential events based on inputs from multiple channels. Further, training the recommendation model may comprise learning affinities between the item representations. For example, an affinity may be learned between a first item representation occurring via the audio channel and a second item representation occurring via the non-audio channel. The probabilities generated by the recommendation model may correspond to numerical probabilities.

At decision block 508, the trained recommendation model determines if a stopping criterion (i.e., a stopping parameter) has been satisfied by the trained recommendation model. The stopping criterion may be based on the loss function illustrated in Equation 21. The trained recommendation system may determine if the loss function exceeds a given loss. The stopping criterion may further correspond to a given accuracy of the trained recommendation model. For example, the stopping criterion may be that the trained recommendation model should accurately choose a recommendation a threshold percentage of the time (e.g., 90% of the time, 95% of the time, or 99% of the time). In some embodiments, the stopping criterion may correspond to other factors associated with the trained recommendation model. In some embodiments, the process 500 may return to block 506 when the trained recommendation model determines that the stopping criterion has not been satisfied and the trained recommendation model may continue to be trained in one or more additional iterations using the plurality of item representations. Training the trained recommendation model for additional iterations may include first adjusting one or more of the trainable parameters, as described below with respect to block 510. For example, retraining the trained recommendation model may include adjusting a weight for the plurality of repeated event probabilities and/or the plurality of general event probabilities. When the recommendation model determines that the stopping criterion has been satisfied, the process may continue to block 512.

At block 510, the trained recommendation model updates the trainable parameters based on processing the plurality of item representations. The trained recommendation model may be configured to adjust one or more of the weights based on processing the plurality of item representations. Updating the trainable parameters may be based on determining that the model is weighted too heavily towards a given channel or that the model is weighted incorrectly for a given user. Further, equation 21 may be used to update the trainable parameters. A gradient of the equation 21 may be evaluated and can be used to determine the degree to which one or more parameters of the trainable parameters should be changed. Further, the gradient of the equation 21 can be used to determine to determine whether the one or more parameters should be increased or decreased. By adjusting the trainable parameters, the trained recommendation model may be improved to more accurately predict item representations (i.e., to generate probabilities that are more accurate).

At block 512, the trained recommendation model is provided for event recommendation. Subsequent to training the trained recommendation model, item representations may be added to the plurality of item representations to generate an updated plurality of item representations. The trained recommendation model may be used to recommend future potential events. The future potential events may correspond to probabilistic future events that may occur with respect to a given user based on the plurality of item representations. As described herewith, the trained recommendation model may be used to more accurately determine one or more recommendations with respect to a previously generated plurality of item representations. In some embodiments, the recommendation model may be or include a table or listing of probabilities that correspond to individual events associated with a user. In some embodiments, the trained recommendation model may include a computational component, such as a neural network, configured to obtain general event probabilities and/or repeated event probabilities based on previous item representations corresponding to a user.

In some embodiments, the process 500 may return to block 502 where the recommendation model may be trained for a different channel. The recommendation model may be trained using the same plurality of item representations for each channel. In some implementations, the recommendation model may be trained using a different plurality of item representations for each channel.

Figure 6:
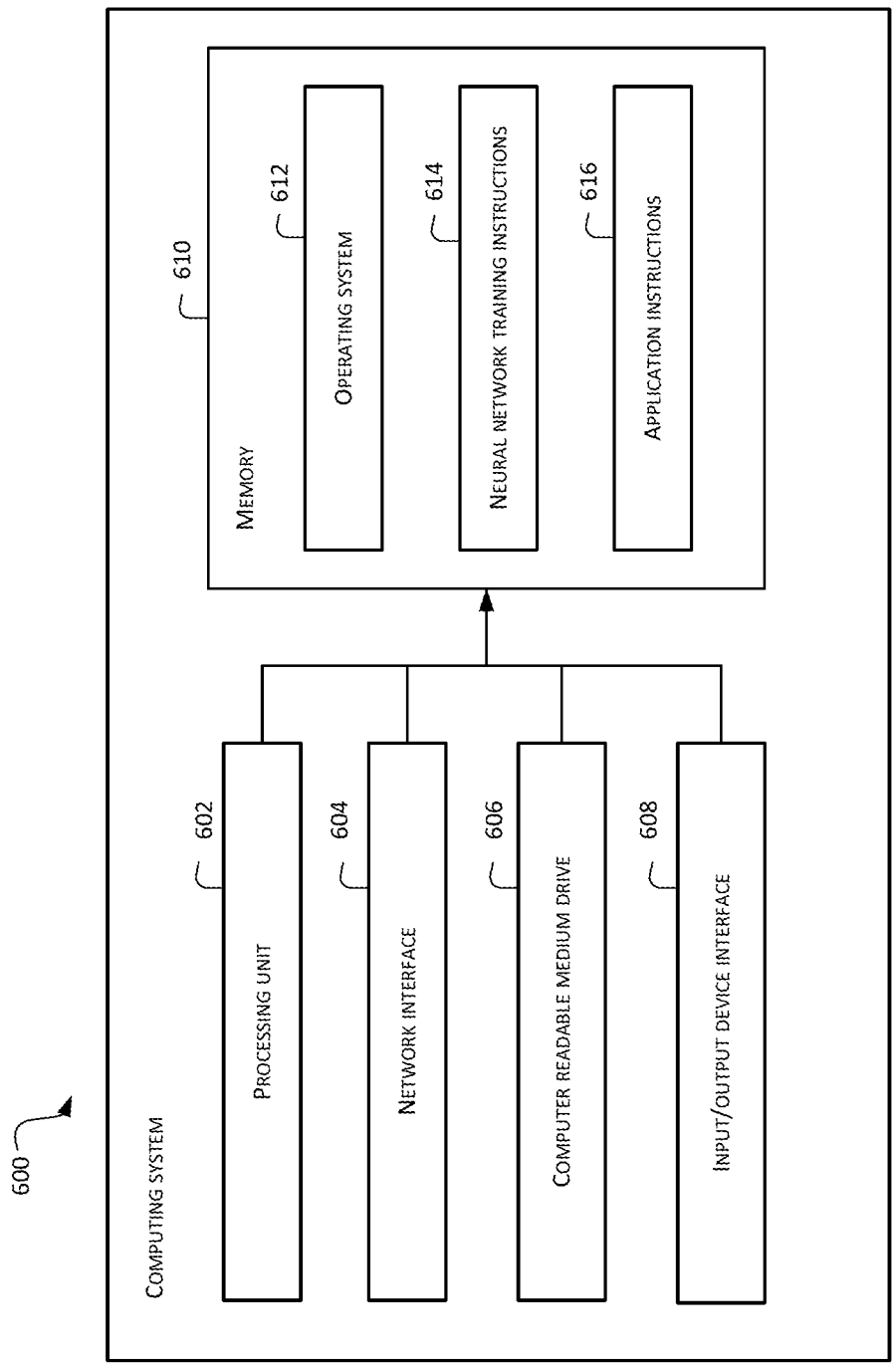
FIG. 6 shows an example computing device that may be used to implement aspects of the present disclosure.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer-readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer-readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer-readable memory 610, etc.

The computer-readable memory 610 may include computer program instructions that the computer processor 602 executes in order to implement one or more embodiments. The computer-readable memory 610 can store an operating system 612 that provides computer program instructions for use by the computer processor 602 in the general administration and operation of the computing system 600. The computer-readable memory 610 can further include computer program instructions and other information for implementing aspects of the present disclosure. For example, in one embodiment, the computer-readable memory 610 may include neural network training instructions 614. As another example, the computer-readable memory 610 may include application instructions 616. In some embodiments, multiple computing systems 600 may communicate with each other via their respective network interfaces 604, and can implement speech processing and/or model training separately (e.g., each computing system 600 may execute one or more separate instances of the processes 400A, 400B, and/or 500), in parallel (e.g., each computing system 600 may execute a portion of a single instance of a process 400A, 400B, and/or 500), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions, and
   one or more computer processors in communication with the computer-readable memory, wherein the one or more computer processors are configured to execute the executable instructions to at least:
      generate a plurality of channel-specific event factors based on a first user representation and a first plurality of item representations, wherein a first factor of the plurality of channel-specific event factors corresponds to a first probability of an event, associated with a first item representation of the first plurality of item representations, occurring via a first interaction channel of a plurality of interaction channels;
      generate a plurality of channel-independent event factors based on the first user representation and the first plurality of item representations, wherein a second factor of the plurality of channel-independent event factors corresponds to a second probability of the event, associated with the first item representation, occurring via any interaction channel of the plurality of interaction channels;
      combine individual channel-specific event factors of the plurality of channel-specific event factors with corresponding channel-independent event factors of the plurality of channel-independent event factors to generate a plurality of augmented channel-specific event factors;
      generate, using a model trained to learn a relationship between one or more events occurring via the first interaction channel and one or more events occurring via a second interaction channel of the plurality of interaction channels, a recommendation associated with the first item representation based on the plurality of augmented channel-specific event factors and the learned relationship;
      transmit the recommendation via the first interaction channel; and
      train the model to update the learned relationship based on a response to the recommendation.

2. The system of claim 1, wherein the one or more computer processors are further configured to execute the executable instructions to at least:
   generate a plurality of general event probabilities based on the plurality of augmented channel-specific event factors, wherein the plurality of general event probabilities comprises a probability of occurrence of the event, and wherein the first plurality of item representations comprises representations of items in an item catalog.

3. The system of claim 2, wherein the one or more computer processors are further configured to execute the executable instructions to at least:
   generate a second plurality of channel-specific event factors based on a second user representation and a second plurality of item representations, wherein a third factor of the second plurality of channel-specific event factors corresponds to a third probability of the event associated with the first item representation reoccurring via the first interaction channel, and wherein the second plurality of item representations comprises representations of items associated with prior events;
   generate a second plurality of channel-independent event factors based on the second user representation and the second plurality of item representations, wherein a fourth factor of the second plurality of channel-independent event factors corresponds to a fourth probability of the event associated with the first item representation reoccurring via any interaction channel of the plurality of interaction channels;
   combine individual channel-specific event factors of the second plurality of channel-specific event factors with corresponding channel-independent event factors of the second plurality of channel-independent event factors to generate a second plurality of augmented channel-specific event factors; and
   generate a plurality of repeated event probabilities based on the second plurality of augmented channel-specific event factors, wherein the plurality of repeated event probabilities comprises a probability of a reoccurrence of the event associated with the first item representation.

4. The system of claim 3, wherein the one or more computer processors are further configured to execute the executable instructions to at least:
   generate a first weight associated with the plurality of general event probabilities, wherein the first weight is generated based on a third user representation;
   generate a second weight associated with the plurality of repeated event probabilities, wherein the second weight is generated based on the third user representation; and
   generate a plurality of output event probabilities based on the first weight, the second weight, the plurality of general event probabilities, and the plurality of repeated event probabilities, wherein the recommendation is based on the plurality of output event probabilities.

5. The system of claim 1, wherein the one or more computer processors are further configured to execute the executable instructions to at least:
   generate a plurality of repeated event probabilities based on the plurality of augmented channel-specific event factors, wherein the plurality of repeated event probabilities comprises a probability of a reoccurrence of the event associated with the first item representation.

6. The system of claim 1, wherein the first factor of the plurality of channel-specific event factors comprises a tri-factor product based on a channel-specific parameter matrix and the first user representation.

7. The system of claim 1, wherein the second factor of the plurality of channel-independent event factors comprises a dot product based on the first user representation and the first item representation.

8. The system of claim 1, wherein the one or more computer processors are further configured to execute the executable instructions to at least:
   obtain the first plurality of item representations, wherein a first subset of the first plurality of item representations corresponds to audio interface events associated with a user, and wherein a second subset of the first plurality of item representations corresponds to graphical interface events associated with the user;
   generate a plurality of event representations based on the first plurality of item representations and time data associated with the audio interface events and graphical interface events; and generate a plurality of user representations comprising the first user representation based on the plurality of event representations.

9. The system of claim 1, wherein the recommendation is based at least in part on a time-recency bias, wherein the first item representation is associated with first time data and a second item representation is associated with second time data, wherein the time-recency bias is based on the first time data and the second time data.

10. A computer-implemented method comprising:
under control of a computing system comprising one or more processors configured to execute specific instructions,
generating a plurality of channel-specific event factors based on a first user representation and a first plurality of item representations, wherein a first factor of the plurality of channel-specific event factors corresponds to a first probability of an event, associated with a first item representation of the first plurality of item representations, occurring via a first interaction channel of a plurality of interaction channels;
generating a plurality of channel-independent event factors based on the first user representation and the first plurality of item representations, wherein a second factor of the plurality of channel-independent event factors corresponds to a second probability of the event, associated with the first item representation, occurring via any interaction channel of the plurality of interaction channels;
combining individual channel-specific event factors of the plurality of channel-specific event factors with corresponding channel-independent event factors of the plurality of channel-independent event factors to generate a plurality of augmented channel-specific event factors;
generating, using a model trained to learn a relationship between one or more events occurring via the first interaction channel and one or more events occurring via a second interaction channel of the plurality of interaction channels, a recommendation associated with the first item representation based on the plurality of augmented channel-specific event factors and the learned relationship;
transmitting the recommendation via the first interaction channel; and
training the model to update the learned relationship based on a response to the recommendation.

11. The computer-implemented method of claim 10, further comprising generating a plurality of general event probabilities based on the plurality of augmented channel-specific event factors, wherein the plurality of general event probabilities comprises a probability of occurrence of the event, and wherein the first plurality of item representations comprises representations of items in an item catalog.

12. The computer-implemented method of claim 11, further comprising:
generating a second plurality of channel-specific event factors based on a second user representation and a second plurality of item representations, wherein a third factor of the second plurality of channel-specific event factors corresponds to a third probability of the event associated with the first item representation reoccurring via the first interaction channel, and wherein the second plurality of item representations comprises representations of items associated with prior events;
generating a second plurality of channel-independent event factors based on the second user representation and the second plurality of item representations, wherein a fourth factor of the second plurality of channel-independent event factors corresponds to a fourth probability of the event associated with the first item representation reoccurring via any interaction channel of the plurality of interaction channels;
combining individual channel-specific event factors of the second plurality of channel-specific event factors with corresponding channel-independent event factors of the second plurality of channel-independent event factors to generate a second plurality of augmented channel-specific event factors; and
generating a plurality of repeated event probabilities based on the second plurality of augmented channel-specific event factors, wherein the plurality of repeated event probabilities comprises a probability of a reoccurrence of the event associated with the first item representation.

13. The computer-implemented method of claim 12, further comprising:
generating a first weight associated with the plurality of general event probabilities, wherein the first weight is generated based on a third user representation;
generating a second weight associated with the plurality of repeated event probabilities, wherein the second weight is generated based on the third user representation; and
generating a plurality of output event probabilities based on the first weight, the second weight, the plurality of general event probabilities, and the plurality of repeated event probabilities, wherein the recommendation is based on the plurality of output event probabilities.

14. The computer-implemented method of claim 10, further comprising generating a plurality of repeated event probabilities based on the plurality of augmented channel-specific event factors, wherein the plurality of repeated event probabilities comprises a probability of a reoccurrence of the event associated with the first item representation.

15. The computer-implemented method of claim 10, wherein generating the plurality of channel-specific event factors comprises generating a tri-factor product based on a channel-specific parameter matrix and the first user representation.

16. The computer-implemented method of claim 10, further comprising:
obtaining the first plurality of item representations, wherein a first subset of the first plurality of item representations corresponds to audio interface events associated with a user, and wherein a second subset of the first plurality of item representations corresponds to graphical interface events associated with the user;
generating a plurality of event representations based on the first plurality of item representations and time data associated with the audio interface events and graphical interface events; and
generating a plurality of user representations comprising the first user representation based on the plurality of event representations.

17. The computer-implemented method of claim 10, wherein the recommendation is based at least in part on a time-recency bias, wherein the first item representation is associated with first time data and a second item representation is associated with second time data, wherein the time-recency bias is based on the first time data and the second time data.

18. The computer-implemented method of claim 10, further comprising:
  obtaining the first plurality of item representations;
  obtaining time data indicating an event time associated with the first plurality of item representations;
  generating a plurality of event representations using the first plurality of item representations and the time data;
  generating a plurality of embedded representations from the plurality of event representations, wherein the plurality of embedded representations indicate a dependency between item representations of the first plurality of item representations based on a semantic affinity in an embedding space; and
  generating the first user representation based on the plurality of embedded representations.

19. The computer-implemented method of claim 10, wherein the recommendation comprises a prompt to purchase an item associated with the first item representation, the computer-implemented method further comprising, in response to transmitting the recommendation, preparing the item for purchase.

20. The computer-implemented method of claim 10, wherein transmitting the recommendation comprises causing the recommendation to be presented to a user via a device using the first interaction channel.

* * * * *